(12) United States Patent
Lee et al.

(10) Patent No.: US 7,834,871 B2
(45) Date of Patent: Nov. 16, 2010

(54) SPLAT FILTERING METHOD, MEDIUM, AND SYSTEM

(75) Inventors: Shin-Iun Lee, Yongin-si (KR); Gyeong-la Jang, Yongin-si (KR); Seok-yoon Jung, Yongin-si (KR); Alexei Sosnov, Yongin-si (KR); Do-kyoon Kim, Yongin-si (KR); Keun-ho Kim, Yongin-si (KR); Alexander Zhirkove, Moscow (RU); Alexander Parshin, Moscow (RU)

(73) Assignee: Samsung Electronics Co., Ltd., Suwon-Si (KR)

( * ) Notice: Subject to any disclaimer, the term of this patent is extended or adjusted under 35 U.S.C. 154(b) by 782 days.

(21) Appl. No.: 11/717,184

(22) Filed: Mar. 13, 2007

(65) Prior Publication Data

US 2007/0216707 A1 Sep. 20, 2007

(30) Foreign Application Priority Data

Mar. 16, 2006 (KR) .................. 10-2006-0024268

(51) Int. Cl.
*G06T 15/00* (2006.01)

(52) U.S. Cl. .................................................... 345/419
(58) Field of Classification Search ................ 345/611, 345/419
See application file for complete search history.

(56) References Cited

U.S. PATENT DOCUMENTS

2003/0189579 A1* 10/2003 Pope .......................... 345/660
2006/0077204 A1* 4/2006 Pfister et al. ................ 345/424

OTHER PUBLICATIONS

Nvidia Technical Brief, Nvidia Accuview Technology, Jan. 24, 2002.*
"Low Pass Filter" <http://en.wikipedia.org/w/index.php?title=Low-pass_filter&oldid=41044348> Retrieved Oct. 26, 2009, published on the web on Feb. 24, 2006.*

* cited by examiner

*Primary Examiner*—Xiao M Wu
*Assistant Examiner*—Scott E Sonners
(74) *Attorney, Agent, or Firm*—Staas & Halsey LLP

(57) ABSTRACT

A filtering system, medium, and method, including determining whether a size of a splat exceeds a predetermined size, smoothing a boundary of the splat if it is determined that the size of the splat exceeds the predetermined size, and sharpening the boundary of the splat if it is determined that the size of the splat does not exceed the predetermined size.

19 Claims, 10 Drawing Sheets

SPLAT FILTERING METHOD, MEDIUM, AND SYSTEM

CROSS-REFERENCE TO RELATED APPLICATIONS

This application claims the benefit of Korean Patent Application No. 10-2006-0024268, filed on Mar. 16, 2006, in the Korean Intellectual Property Office, the disclosure of which is incorporated herein in its entirety by reference.

BACKGROUND

1. Field of the Invention

One or more embodiments of the present invention relate to filtering, and more particularly, to a splat filtering method, medium, and system improving the quality of a rendered image.

2. Description of the Related Art

When rendering an image, such as a two-dimensional (2D) image, from pixel information from differing points of view, pixel maps are often used. Here, such pixel maps can include color and/or transparency information for each pixel, as well as depth information. This information could be generated from an initial view point(s). When attempting to render an image, e.g., from a point model made up of a combination of points and having a three-dimensional (3D) shape, from another point of view, even if in a same line of view, a point-based rendering algorithm may be used to generate planar splats such as a square or a circle for each of the points on which the point model is projected. These splats can be representative of a pixel as viewed from a different point of view, e.g., a splat can represent how a pixel could be viewed from a different point of view, perhaps in a warped shape. For example, as a pixel point of view moves far to the left, right, above, and/or below a pixel point, the representative splat would become more warped in an oblong or elliptical shape differently from the pixel points original shape, taking into consideration the original pixel map information for the pixel point.

As another example, according to the above point-based rendering algorithm, the points on which the point model is projected may be arranged closer to a point of view, and planar splats such as a circle are generated according to the arrangement of the points, thereby causing two planar splats to overlap. In this case, a scaling effect occurs so that planar splats look like scales, which deteriorates the appearance of the rendered point model. The larger the planar splats are, the worse the scaling effect becomes.

Conversely, if planar splats become small enough to be frosty, an aliasing phenomenon occurs so that a boundary between planar splats becomes smoothed, which also deteriorates the appearance of the rendered point model. The smaller the planar splats are, the worse the aliasing phenomenon becomes.

Consequently, when a point-based rendering algorithm is used to render the point model, the inventors have found a desire for a way of improving the image quality of the rendered point model in order to prevent this scaling effect from worsening when splats become larger and the aliasing phenomenon from worsening when splats become smaller.

SUMMARY

Additional aspects and/or advantages of the invention will be set forth in part in the description which follows and, in part, will be apparent from the description, or may be learned by practice of the invention.

One or more embodiments of the present invention provides a splat filtering method, medium, and system improving the quality of a rendered image.

To achieve the above and/or other aspects and advantages, embodiments of the present invention include a filtering method, including determining whether a size of a splat for rendering at least one pixel meets a predetermined size, and smoothing a boundary of the splat if the size of the splat is determined to meet the predetermined size.

To achieve the above and/or other aspects and advantages, embodiments of the present invention include a filtering method, including determining whether a size of a splat for rendering at least one pixel meets a predetermined size, and sharpening a boundary of the splat if the size of the splat is determined to not meet the predetermined size.

To achieve the above and/or other aspects and advantages, embodiments of the present invention include a filtering method including selectively one of smoothing and sharpening a boundary of a splat for rendering at least one pixel, respectively based on whether a size of a splat meets a predetermined size.

To achieve the above and/or other aspects and advantages, embodiments of the present invention include a filtering system, including a checking unit to determine whether a size of a splat for rendering at least one pixel meets a predetermined size, a first filtering unit to smooth a boundary of the splat based on a corresponding determination result of the checking unit indicating that the size of the splat meets the predetermined size, and a second filtering unit to sharpen the boundary of the splat based on the corresponding determination of the checking unit indicating that the size of the splat does not meet the predetermined size.

To achieve the above and/or other aspects and advantages, embodiments of the present invention include at least one medium including computer readable code to control at least one processing element to implement an embodiment of the present invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Figure 1:
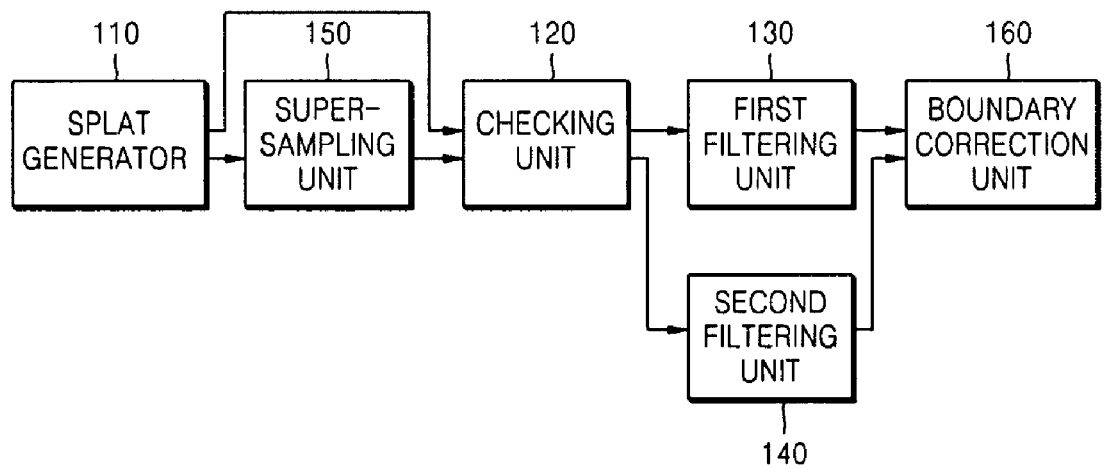
FIG. 1 illustrates a filtering system, according to an embodiment of the present invention.

Reference will now be made in detail to embodiments of the present invention, examples of which are illustrated in the accompanying drawings, wherein like reference numerals refer to the like elements throughout. Embodiments are described below to explain the present invention by referring to the figures.

Briefly, such filtering method, medium, and system embodiments of the present invention are described below, noting that embodiments may be embodied in many different forms and should not be construed as being limited to the embodiments set forth herein.

FIG. 1 illustrates a filtering system, which may similarly encompass a point-based rendering system, according to an embodiment of the present invention. Referring to FIG. 1, the filtering system may include a splat generator 110, a checking unit 120, a first filtering unit 130, a second filtering unit 140, a super-sampling unit 150, and a boundary correction unit 160, for example.

Such a point-based rendering system may render a point model by generating a splat corresponding to each to be rendered point. The point model may include a combination of points, with the points in the point model being referred to as image points. Here, as noted above, an image point can have 3D data, and therefore, the point model can have a 3D shape.

In a projector operation, rendered points are generated. The point model is projected on a predetermined screen, for example. That is, the rendered points result from the generation of image points for projection on a screen, for example. Accordingly, as noted above, an image point can have 3D data, potentially including depth information, whereas a rendered point can represent only 2D data. The rendered point includes color and location information of the image point. The projector operation can project all the image points or some image points making up the point model. According to an embodiment, the screen can be considered perpendicular to a desired point of view and can be designated to be a plane spaced apart from the point of view by a predetermined distance, noting that this is just one example of the screen and point of view interrelationship. Thus, the rendered image results from the rendering of the point model. The rendered screen may include a plurality of pixels, with one rendered point potentially being displayed on at least one pixel. Here, when one rendered point is displayed on one pixel, the rendered point can be displayed over the whole pixel or just a portion of the pixel. Further, a plurality of rendered points can also be displayed on a pixel, depending on the rendering.

The splat generator 110 may perform a splatting operation, i.e., the generating of splats, corresponding to each to be a rendered point. As noted above, the splat is an object used for visualization of a rendered point. In this regard, visualization means rendering. Conventional point-based rendering algorithms are used to generate a planar splat, whereas an embodiment of the present invention generates a planar splat such as a square or circle, or a three-dimensional splat, such as a hemisphere or sphere, noting that alternate three-dimensional splats are equally available. Here, planar splatting means the generation of a planar splat, and three-dimensional splatting means the generation of the three-dimensional splat.

The checking unit 120 may determine whether the size or area of a splat meets or exceeds a predetermined limit. Scaling effects becomes worse when the size or area of the splat exceeds the predetermined limit, while aliasing becomes worse as the size or area of the splat extends below the predetermined limit.

The first filtering unit 130 may perform a first filtering, and the second filtering unit 140 may perform a second filtering. More specifically, the first filtering unit 130 may smooth a boundary of the splat, e.g., based on a result obtained by the checking unit 120, and the second filtering unit 140 may sharpen the boundary of the splat, e.g., based on the result obtained by the checking unit 120.

In an embodiment, the size or area of the splat may be set in advance as to what extent the boundary of the splat is smoothened or sharpened.

A planar splat may occupy at least one pixel on a resultant screen or only a part of the pixel. Likewise, three-dimensional splats may occupy at least one pixel on the resultant screen or only a part of a pixel. In an embodiment, since all splats occupy pixels, the predetermined size may be expressed as a number of pixels.

The first filtering unit 130 and the second filtering unit 140 will be described in greater detail below.

Thus, the checking unit 120 may determine whether the size or volume of a splat meets or exceeds a predetermined limit. Here, the volume of the splat is an example of the size of the splat. Again, if the volume of the splat exceeds the predetermined limit, the first filtering unit 130 may smooth the boundary of the splat, while, if the volume of the splat does not exceed the predetermined limit, the second filtering unit 140 may sharpen the boundary of the splat. In an embodiment, if the predetermined size is the volume of two pixels, the first filtering unit 130 may operate when the splat occupies a plurality of pixels, and the second filtering unit 140 may operate when the splat occupies a single pixel, noting that this is just one example.

As described above, the predetermined size can be expressed as the number of "pixel X n (n is a natural number)". In this case, a pixel may need to be small in order to set the predetermined size in detail. When the pixel is large, the aforementioned super-sampling unit 150 can be used to set the predetermined size in greater detail.

In an embodiment, the super-sampling unit 150 may super-sample all splats generated by the splat generator 110, so that the predetermined size can be expressed as the number of "sub-pixel X n". Such a sub-pixel is a virtual pixel, and is smaller than a virtual pixel. The super-sampling operation will be described in greater detail below with reference to FIG. 2.

The boundary correction unit 160 of FIG. 1 may expand the size/area of a splat forming the boundary of a rendered image, and correct the boundary of the rendered image using the expanded size/area of the splat for the rendering of the corresponding point model. Here, as noted, the boundary correction unit 160 may be implemented even when the splat is spherical cubic, for example. The operation of the boundary correction unit 160 will be described in greater detail below with reference to FIG. 3.

The filtering system, of this embodiment of the present invention, may thus, include the splat generator 110, the checking unit 120, the first filtering unit 130, the second filtering unit 140, the super-sampling unit 150, and the boundary correction unit 160.

However, a filtering system of another embodiment of the present invention may not include the super-sampling unit 150. Further, a filtering system of still another embodiment of the present invention may not include the boundary correction unit 160, or even the super-sampling unit 150 and the boundary correction unit 160.

Figure 2A:
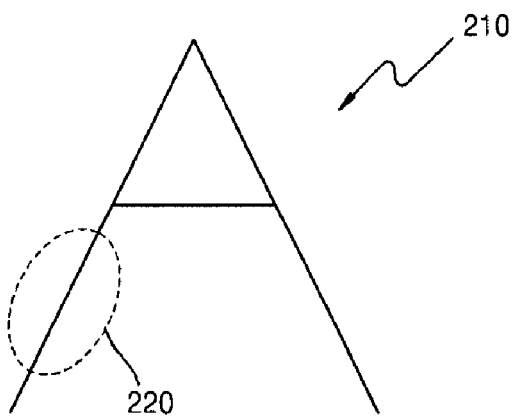
FIGS. 2A through 2E illustrate a super-sampling operation.
Figure 2B:
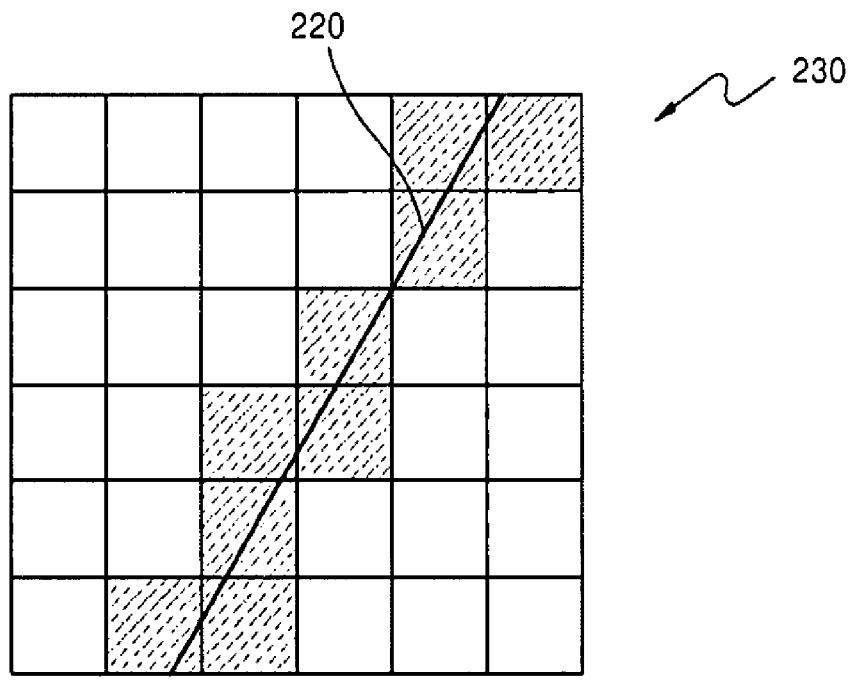
Figure 2C:
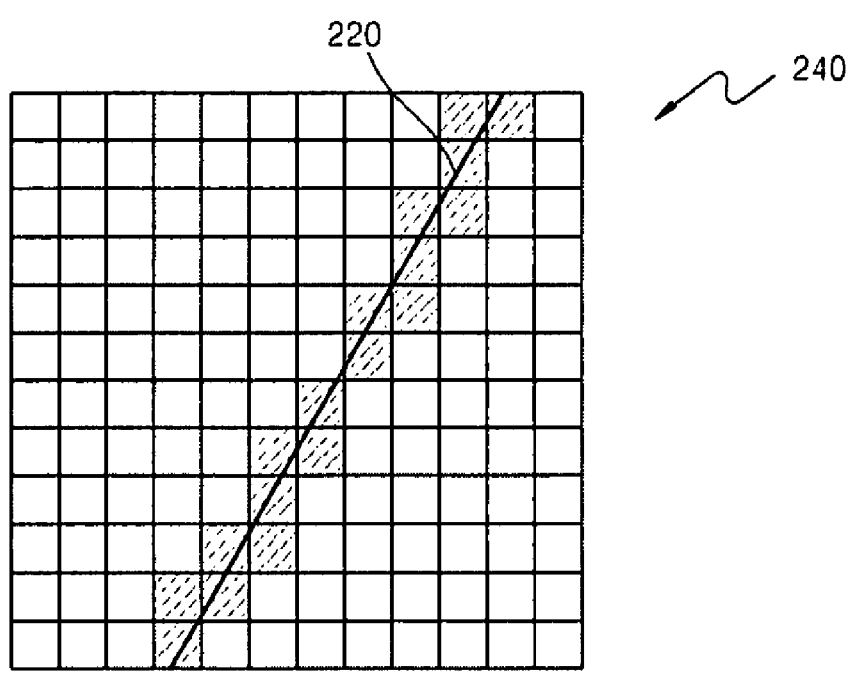
Figure 2D:
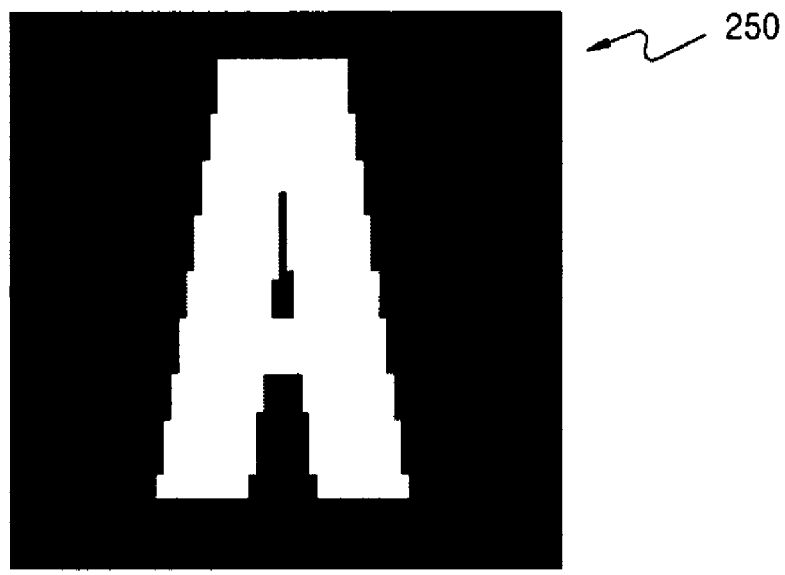
Figure 2E:
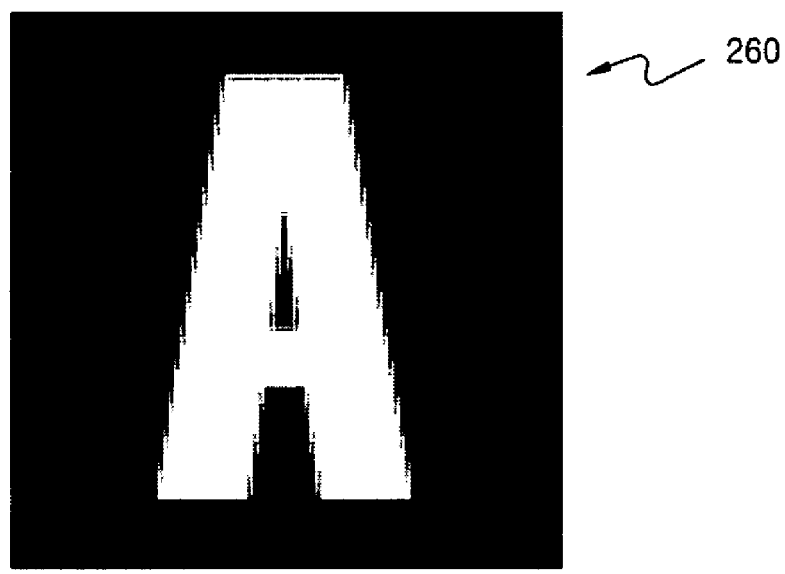

FIGS. 2A through 2E illustrate a super-sampling operation. More specifically, FIG. 2A illustrates a rendered image 210, FIG. 2B illustrates a screen 230 that displays a partial image 220 of the rendered image 210, FIG. 2C illustrates a result 240 obtained by super-sampling the partial image 220, FIG. 2D illustrates a screen 250 that displays the rendered image 210, and FIG. 2E illustrates a result 260 obtained by super-sampling the rendered image 210.

Referring to FIG. 2A, the rendered image 210 is illustrated as a rectilinear line and includes a plurality of splats. Referring to FIG. 2B, each of 36 squares, potentially representing pixels, indicates a virtual pixel displayed on the screen 230. Referring to FIG. 2C, each of 144 squares, i.e., sub-pixels, indicates a virtual pixel. As illustrated in FIGS. 2A through 2E, when pixels are large, the predetermined size can be set in detail by super-sampling images.

Figure 3A:
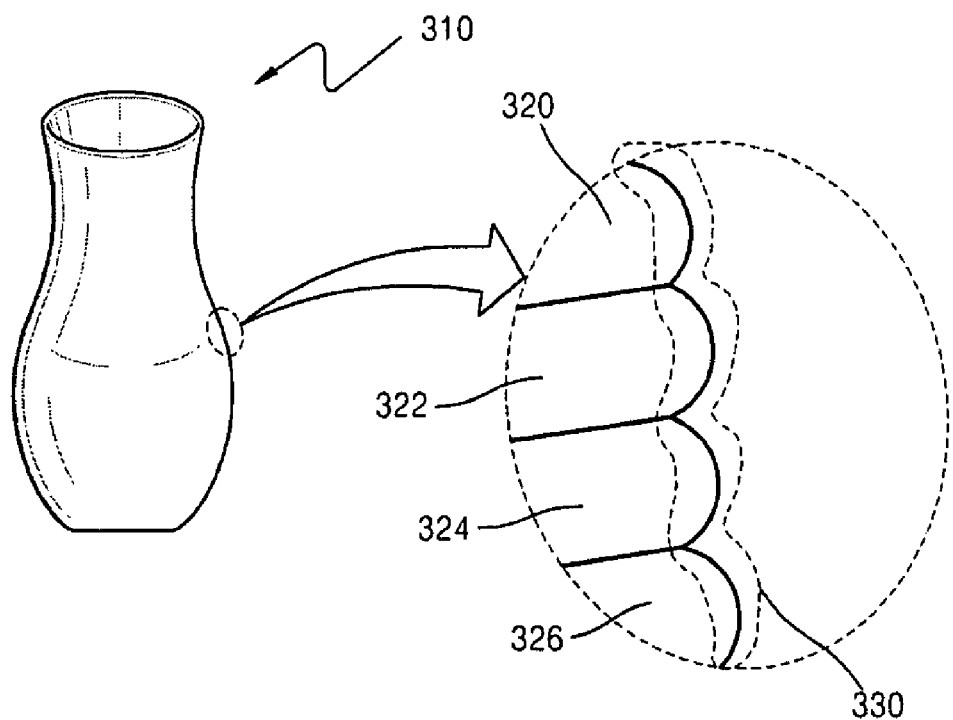
FIGS. 3A and 3B illustrate an operation of a boundary correction unit, such as that illustrated in FIG. 1, according to an embodiment of the present invention.
Figure 3B:
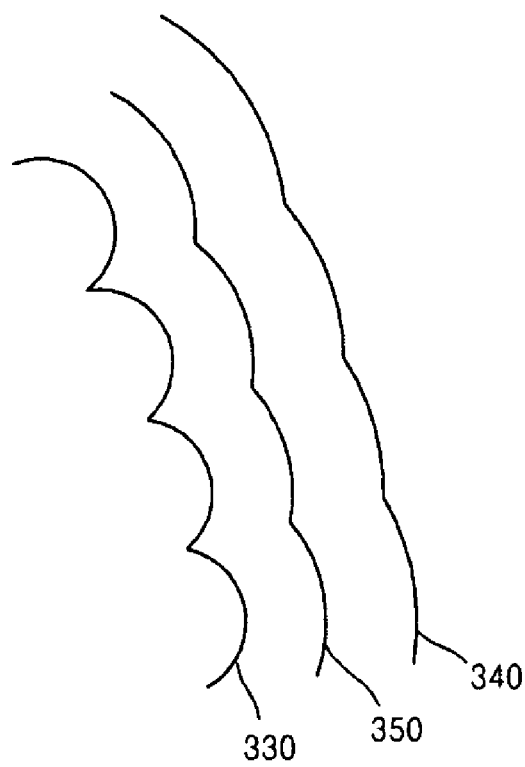

FIGS. 3A and 3B illustrate an operation of a boundary correction unit 160, such as that illustrated in FIG. 1. More specifically, FIG. 3A illustrates a rendered image 310 and an image 320 obtained by expanding a partial image of the rendered image 310. Since splats 320, 322, 324, and 326 have a spherical or hemispherical shape, illustrated as curved partial splats, the boundary 330 of the rendered image 310 has ridges, which results in poor projections.

FIG. 3B illustrates a principle of smoothly correcting the boundary 330 of the rendered image 310. The boundary correction unit 160 may expand each of the splats 320, 322, 324, and 326 forming the boundary 330 of the rendered image 310 by a predetermined ratio, for example, thereby forming a boundary 340 smoother than the boundary 330. The boundary 340 is a boundary result of each of the expanded splats. The boundary correction unit 160, thus, can generate a boundary 350 having location information which is an average of location information of the boundaries 330 and 340. In this case, the boundary 330 of the rendered image 310 may be changed to the boundary 350 having average location information. Such a change results in the expansion of the rendered image 310. In one embodiment, color information of an expanded portion of the rendered image 310 can be color information of one of the splats 320, 322, 324, and 326. For example, if the expanded portion is an expanded splat 322, color information of the expanded portion can be color information of the splat 322. If the expanded portion is the expanded splat 322 and an expanded splat 324, color information of the expanded portion can be color information of the splat 322 or color information of the splat 324.

Figure 4:
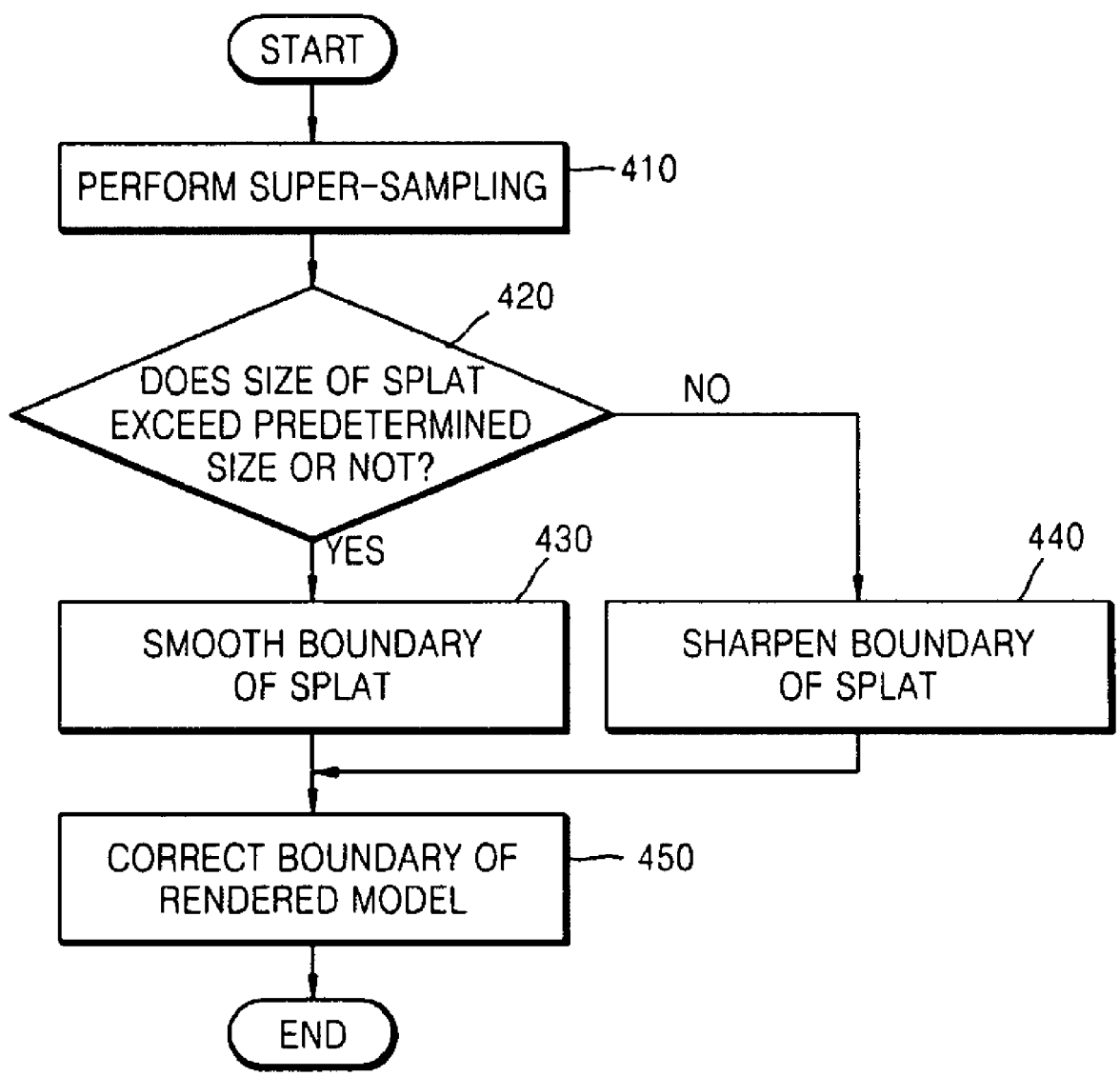
FIG. 4 illustrates a filtering method, according to an embodiment of the present invention.

FIG. 4 illustrates a filtering method, according to an embodiment of the present invention. Referring to FIG. 4, the splat filtering method may include operations 410 through 450 for improving quality of a rendered image.

A generated splat may be super-sampled, in operation 410, and whether the size/area/volume of the splat exceeds a predetermined size may be determined, in operation 420.

If the size of the splat exceeds the predetermined size, a boundary of the splat may be smoothed, in operation 430, and if the size of the splat does not exceed the predetermined size, the boundary of the splat may be sharpened, in operation 440.

The boundary correction unit 160 may further correct a boundary of a rendered image in operation 450.

A filtering method of another embodiment may not include operation 410, while a filtering method of still another embodiment may not include operation 450. Sill further, a filtering method of yet another embodiment may not include operations 410 and 450.

Figure 5A:
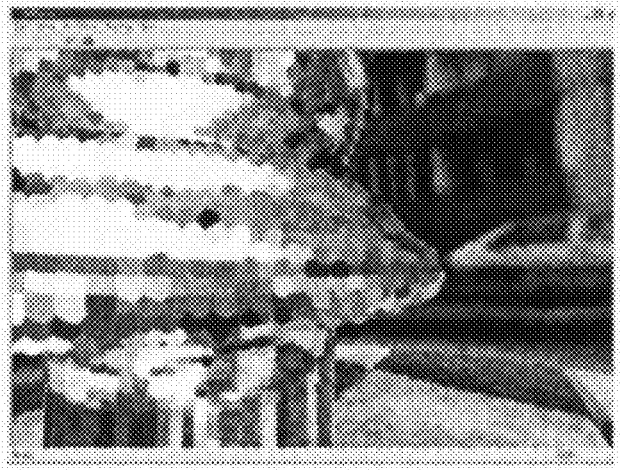
FIGS. 5A and 5B illustrate an effect of a filtering according to another embodiment of the present invention.
Figure 5B:
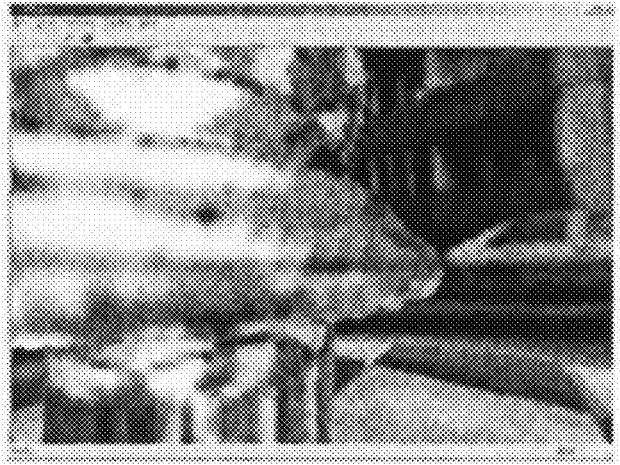

FIGS. 5A and 5B illustrate an effect of a filtering system, medium, and method, according to an embodiment of the present invention. More specifically, FIG. 5A shows a rendered image that has not been filtered, and FIG. 5B shows a rendered image that has been filtered. Referring to FIGS. 5A and 5B, the splats have a spherical shape, and an embossing effect is more remarkable in the rendered image shown in FIG. 5A than the rendered image shown in FIG. 5B. Here, this embossing effect means that the rendered image looks embossed, which deteriorates appearance of the rendered image. The embossing effect occurs in a spherical or hemispherical splat, whereas a scale effect occurs in a planar (circular or square) splat.

Figure 6A:
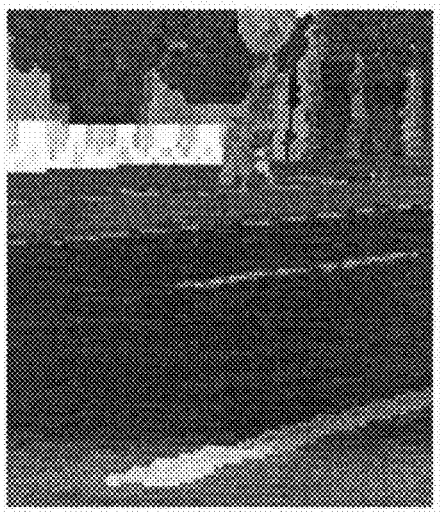
FIGS. 6A, 6B, and 6C illustrate an effect of a filtering according to another embodiment of the present invention.
Figure 6B:
Figure 6C:

FIGS. 6A, 6B, and 6C illustrate an effect of a filtering system, medium, and method, according to another embodiment of the present invention. More specifically, FIG. 6A shows a rendered image that has not been filtered, FIG. 6B shows a rendered image that has been filtered two times, and FIG. 6C shows a rendered image that has been filtered two times and also super-sampled. Referring to FIGS. 6A, 6B, and 6C, the splats have a spherical shape, and an embossing effect is more remarkable in the rendered image shown in FIG. 6A than the rendered image shown in FIG. 6B, and the embossing effect is more remarkable in the rendered image shown in FIG. 6B than the rendered image shown in FIG. 6C.

Figure 7A:
FIGS. 7A, 7B, and 7C illustrate an effect of a filtering, according to another embodiment of the present invention.
Figure 7B:
Figure 7C:

FIGS. 7A, 7B, and 7C illustrate an effect of a filtering system, medium, and method, according to another embodiment of the present invention. More specifically, FIG. 7A shows a rendered image that has not been filtered, FIG. 7B shows a rendered image that has been filtered two times, and FIG. 7C shows a rendered image that has been filtered two times and also super-sampled. Referring to FIGS. 7A, 7B, and 7C, the splats have a spherical shape, and an embossing effect is more remarkable in the rendered image shown in FIG. 7A than the rendered image shown in FIG. 7B, and the embossing effect is more remarkable in the rendered image shown in FIG. 7B than the rendered image shown in FIG. 7C.

Figure 8A:
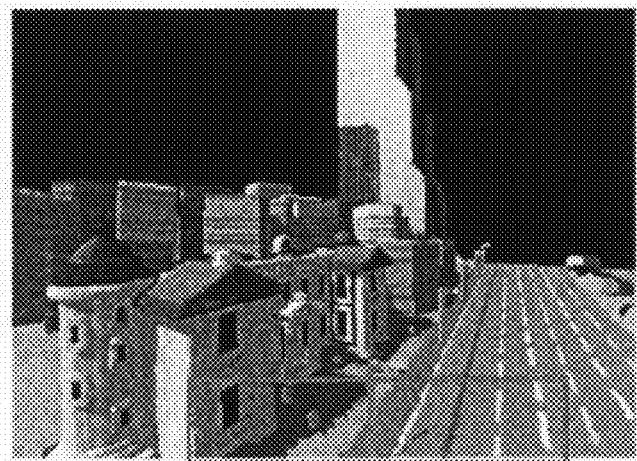
FIGS. 8A and 8B illustrate an effect of a filtering, according to still another embodiment of the present invention.
Figure 8A:
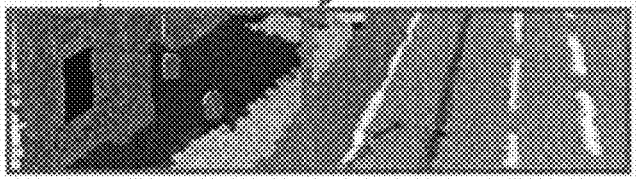
Figure 8B:
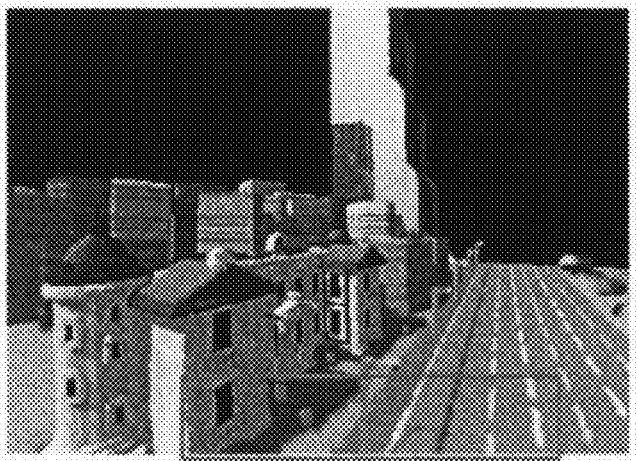
Figure 8B:
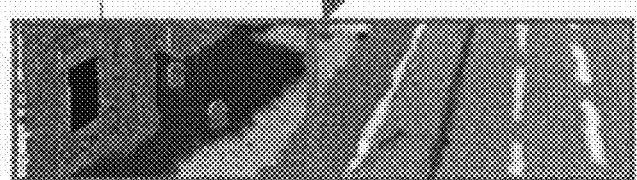

FIGS. 8A and 8B illustrate an effect of a filtering system, medium, and method, according to another embodiment of the present invention. More specifically, FIG. 8A shows a rendered image 810 that has not been filtered and an image 830 obtained by expanding a partial image 820 of the rendered image 830. FIG. 8B shows a rendered image 840 that has been filtered two times and an image 860 obtained by expanding a partial image 850 of the rendered image 840. Referring to FIGS. 8A and 8B, the splats have a spherical shape, and an embossing effect is more remarkable in the rendered image 830 shown in FIG. 8A than the rendered image 860 shown in FIG. 8B.

Figure 9A:
FIGS. 9A and 9B illustrate an effect of a filtering, according to yet another embodiment of the present invention.
Figure 9B:
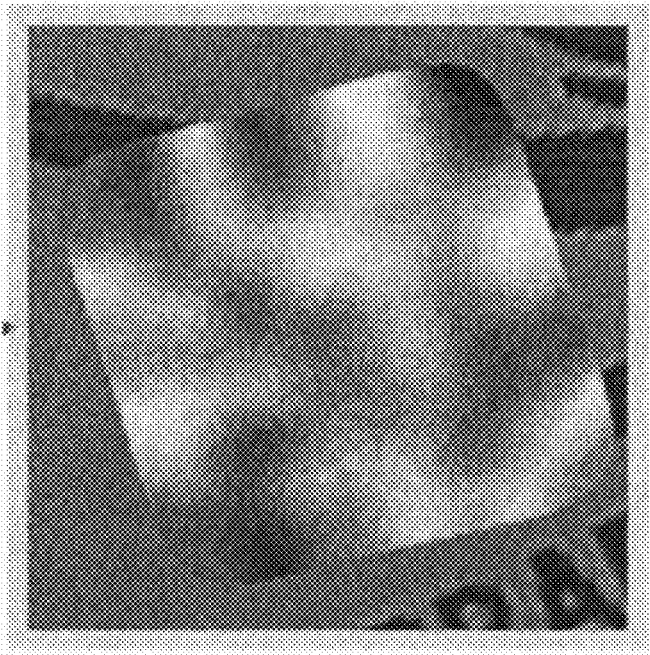

FIGS. 9A and 9B illustrate an effect of a filtering system, medium, and method according to yet another embodiment of the present invention. More specifically, FIG. 9A shows a rendered image with an uncorrected boundary, and FIG. 9B shows a rendered image with a corrected boundary. Referring to FIGS. 9A and 9B, the boundaries of the rendered images are smoothed.

In addition to the above described embodiments, embodiments of the present invention can also be implemented through computer readable code/instructions in/on a medium, e.g., a computer readable medium, to control at least one processing element to implement any above described embodiment. The medium can correspond to any medium/media permitting the storing and/or transmission of the computer readable code.

The computer readable code can be recorded/transferred on a medium in a variety of ways, with examples of the medium including magnetic storage media (e.g., ROM, floppy disks, hard disks, etc.), optical recording media (e.g., CD-ROMs, or DVDs), for example. The media may also be a distributed network, so that the computer readable code is stored/transferred and executed in a distributed fashion. Still further, as only an example, the processing element could include a processor or a computer processor, and processing elements may be distributed and/or included in a single device.

The filtering system, medium, and method, according to one or more embodiments of the present invention, smooth a boundary of a splat exceeding a predetermined size and sharpens a boundary of a splat not exceeding the predetermined size, thereby improving quality of a rendered image. The filtering system, medium, and method, according to one or more embodiments of the present invention, may also expand a spherical or hemispherical splat forming a boundary of the rendered image, and smooth the boundary of the rendered image based on the expanded splat, thereby improving quality of the rendered image.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A filtering method, comprising:
   determining, using at least one processing device, whether a size of a splat for rendering at least one pixel meets a predetermined size;
   smoothing a boundary of the splat if the size of the splat is determined to meet the predetermined size; and
   expanding the size of the splat, forming a boundary of a rendered image, by a predetermined ratio, and correcting the boundary using the expanded splat.

2. The filtering method of claim 1, further comprising super-sampling a generated splat before performing a determining of whether a size of the generated splat exceeds the predetermined limit.

3. The filtering method of claim 1,
   wherein the splat has a spherical or hemi-spherical shape.

4. The filtering method of claim 1, wherein the splat has a planar shape and the size of the splat corresponds to an area of the splat.

5. The filtering method of claim 1, wherein the splat has a spherical shape and the size of the splat corresponds to a volume of the splat.

6. At least one non-transitory computer readable medium comprising computer readable code to control at least one processing element to implement the method of claim 1.

7. A filtering method, comprising:
   determining, using at least one processing device, whether a size of a splat for rendering at least one pixel meets a predetermined size;
   sharpening a boundary of the splat if the size of the splat is determined to not meet the predetermined size; and
   expanding the size of the splat, forming a new boundary of a rendered image, by a predetermined ratio, and correcting the boundary of the splat using the expanded splat.

8. The filtering method of claim 7, further comprising super-sampling a generated splat before performing a determining of whether a size of the generated splat exceeds the predetermined limit.

9. The filtering method of claim 7,
   wherein the splat has a spherical or hemi-spherical shape.

10. The filtering method of claim 7, wherein the splat has a planar shape and the size of the splat corresponds to an area of the splat.

11. The filtering method of claim 7, wherein the splat has a spherical shape, and the size of the splat corresponds to a volume of the splat.

12. At least one non-transitory computer readable medium comprising computer readable code to control at least one processing element to implement the method of claim 7.

13. A filtering method comprising:
   selectively, using at least one processing device, one of smoothing and sharpening a boundary of a splat for rendering at least one pixel, respectively based on whether a size of the splat meets a predetermined size;
   expanding the size of the splat, forming a new boundary of a rendered image, by a predetermined ratio, and correcting the boundary of the splat using the expanded splat.

14. At least one non-transitory computer readable medium comprising computer readable code to control at least one processing element to implement the method of claim 13.

15. A filtering system, comprising:
   a checking unit to determine whether a size of a splat for rendering at least one pixel meets a predetermined size;
   a first filtering unit to smooth a boundary of the splat based on a corresponding determination result of the checking unit indicating that the size of the splat meets the predetermined size; and
   a second filtering unit to sharpen the boundary of the splat based on the corresponding determination of the checking unit indicating that the size of the splat does not meet the predetermined size; and
   a boundary correction unit to generate an expanded splat by expanding the size of the splat, forming a boundary of a rendered image, by a predetermined ratio, and to correct the boundary of the splat using the expanded splat.

16. The filtering system of claim 15, further comprising:
   a super-sampling unit to perform a super-sampling on a generated splat for providing the splat to the checking unit.

17. The filtering system of claim 15,
   wherein the splat has a spherical or hemi-spherical shape.

18. The filtering system of claim 15, wherein the splat has a planar shape, and the size of the splat corresponds to an area of the splat.

19. The filtering system of claim 15, wherein the splat has a spherical shape, and the size of the splat corresponds to a volume of the splat.

* * * * *

UNITED STATES PATENT AND TRADEMARK OFFICE
CERTIFICATE OF CORRECTION

PATENT NO.           : 7,834,871 B2                                Page 1 of 1
APPLICATION NO.      : 11/717184
DATED                : November 16, 2010
INVENTOR(S)          : Shin-Jun Lee et al.

It is certified that error appears in the above-identified patent and that said Letters Patent is hereby corrected as shown below:

Title Page Column 1 (Inventors), Line 1 delete "Iun" and insert -- Jun --, therefor.

Title Page Column 1 (Inventors), Line 2 delete "Ia" and insert -- Ja --, therefor.

Signed and Sealed this

First Day of February, 2011

David J. Kappos
*Director of the United States Patent and Trademark Office*